3,370,067
HYDROGENOLYSIS OF BUTYROLACTONE AND
γ-VALEROLACTONE TO THE CORRESPOND-
ING CYCLIC ETHERS
Oliver Johnson, Berkeley, Calif., assignor to Shell
Oil Company, New York, N.Y., a corporation of
Delaware
No Drawing. Filed Apr. 7, 1967, Ser. No. 629,097
5 Claims. (Cl. 260—346.1)

ABSTRACT OF THE DISCLOSURE

Tetrahydrofuran and α-methyltetrahydrofuran are produced by the hydrogenolysis of butyrolactone and γ-valerolactone, respectively, in the presence of a transition metal catalyst supported on a solid, acidic, inorganic catalyst carrier.

Background of the invention

The reaction of hydrogen with γ-lactones, e.g. butyrolactone and γ-valerolactone, in the presence of metal catalysts to produce glycols is known in the art (Equation 1). For example, Adkins discloses in "Reaction of Hydrogen," University of Wisconsin Press, Madison, Wisconsin, 1937, that the hydrogenation of butyrolactone and γ-valerolactone in the presence of Raney nickel catalysts gives high yields of the corresponding diols (Equation 1), e.g., 1,4-butanediol and 1,4-pentanediol, with the acids which are produced by hydrogenolysis of the lactone oxygen (Equation 2) and the cyclic ethers which are produced by hydrogenolysis of the carbonyl oxygen (Equation 3) being observed occasionally as minor products.

(Eq. 1)
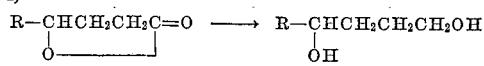

(Eq. 2)

(Eq. 3)
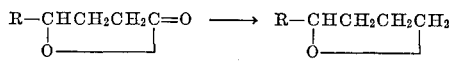

Summary of the invention

It has now been found that the hydrogenation of γ-lactones represented by the formula

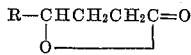

wherein R is hydrogen or methyl in the presence of catalyst compositions comprising a transition metal catalyst and a solid acidic heterogeneous, inorganic catalyst carrier results in the efficient formation of cyclic ethers, e.g., tetrahydrofuran from butyrolactone and α-methyltetrahydrofuran from γ-valerolactone.

Description of preferred embodiments

The process of the invention comprises hydrogenolysis of γ-lactones to the corresponding cyclic ethers in the presence of catalyst compositions containing transition metals. A preferred group of transition metals suitable for use as catalyst are metals of atomic number from 21 to 30 inclusive, e.g., scandium, titanium, chromium, manganese, iron, cobalt, nickel, copper and zinc, particularly the metals of atomic number from 27 to 29, e.g., cobalt, nickel and copper. Also useful are the platinum metals, e.g., ruthenium, rhodium, palladium, osmium, iridium and platinum which are preferably employed as the finely dispersed metal. Particularly preferred platinum metals are ruthenium and platinum.

The high selectivity to cyclic ethers in the process of the invention depends in part on the use as support for the active transition metal catalysts of inorganic, acidic catalyst carriers which are normally solid under conditions of the reaction and are heterogeneous, that is, are substantially insoluble in the reaction medium. Illustrative of suitable inorganic acidic catalyst carriers are inorganic acidic oxides such as alumina and inorganic materials known as siliceous refractory oxides. Suitable siliceous refractory oxides include synthetic components as well as acid treated clays and similar materials such as kieselguhr or crystalline aluminosilicates known in the art as molecular sieves. In general, synthetic siliceous catalysts are preferred over naturally occurring materials or molecular sieves, and exemplary synthetic siliceous catalysts include silica - alumina, silica - magnesia, silica-alumina-titania, silica-alumina-zirconia, silica-titania-zirconia, silica-magnesia-alumina and the like. A particularly preferred siliceous catalyst of this type is silica-alumina.

In many instances, the selectivity to cyclic ether is greatly enhanced by incorporation of an additional acidic component into the catalyst carriers prior to use in the instant process. A preferred modification is the incorporation into the catalyst carriers of about 0.05% to about 2% by weight of a heteropoly acid. Materials known as "heteropoly acids" are described in some detail in "Modern Aspects of Inorganic Chemistry," by H. J. Emeleus et al., Second Edition (1952), pages 207–209. The heteropoly acids are considered to be formed by the union of varying numbers of inorganic acid anhydride molecules, particularly tungstic oxide, molybdic oxide or vanadium pentoxide, with a second inorganic acid, one molecule of which is regarded as serving as the central atom or central ion on the complex heteropoly acid structure. Of particular importance are the 6-poly and 12-poly acids wherein the acidic anhydride is combined with the central acid in a molecular ratio of 6:1 or 12:1 respectively. Typical heteropoly acids suitable for use in the process of the invention include phosphotungstic acid, phosphomolybdic acid, silicotungstic acid, phosphovanadic acid and phosphomolybdictungstic acid. Particularly preferred is phosphotungstic acid. Also suitable, although less preferred, are partial salts of the heteropoly acids, for example, the acids of the heteropoly acid with sodium, barium, copper and lead.

The heteropoly acids, when incorporated on the catalyst carriers, are introduced by any suitable means for example, as by impregnation of the carrier with a co-gellation of the metallic component of a heteropoly acid followed by calcination of the support.

The catalyst composition is prepared by introducing the transition metal catalyst onto the catalyst carrier by conventional methods such as impregnation, precipitation, coprecipitation, ion-exchange, mechanical mixing and the like. The ratio of metal catalyst to carrier in the catalyst composition depends somewhat on the nature of the particular catalyst and carrier employed. Generally, the metal catalyst comprises no more than 50% by weight of the catalyst composition although amounts of catalyst from about 5% to about 25% by weight on the same basis are preferred.

As the catalyst of the invention is heterogeneous, the ratio of the metal catalyst to reactants is not determinative of the high selectivity of the cyclic ethers obtained, although the use of a high proportion of the active catalyst components will usually increase the rate of hydrogenolysis of the lactone. In practice, the ratio by weight of metal hydrogenation catalyst to lactone reactant of from about 1:100 to about 1:10 is satisfactory.

The hydrogenolysis reaction is conducted by contacting the lactone reactant, the catalyst composition and hydrogen at an elevated temperature. Suitable reaction temperatures vary from 100° C. to about 300° C., depending in part upon the particular lactone reactant and the catalyst system employed, with the temperature range of from about 150° C. to about 250° C. being preferred and best results being obtained when a temperature from about 175° C. to 225° C. is utilized. Hydrogen pressures of from 10 atmospheres to 150 atmospheres are satisfactory, with pressures of from about 70 to about 100 atmospheres being preferred.

The reaction is conducted under conditions whereby the lactone reactant is liquid, and is suitably conducted in a batchwise manner as by charging the lactone reactant and the catalyst composition to an autoclave or similar reactor, pressurizing the reactor with hydrogen and maintaining the mixture at reaction temperature and pressure while agitation is applied. In an alternate modification, the reaction is conducted in a continuous operation as by passing the lactone and hydrogen through a tubular reactor wherein the catalyst is maintained in a fixed or fluidized bed. In this modification, it is frequently useful to maintain a constant pressure of hydrogen while the lactone is introduced continuously or in increments.

In addition to the reactants and catalyst composition, inert materials may also be added to serve as reaction diluents, for example, gaseous diluents such as nitrogen, argon and methane, or liquid materials including saturated hydrocarbons such as octane, cyclohexane and decahydronaphthalene. In most cases there is no advantage to be gained through the use of such diluents and in the preferred modifications of the process no diluent is added. It is preferred, however, that the reaction be conducted in a substantially inert reaction environment, that is, in the substantial absence of reactive materials such as oxygen.

Subsequent to reaction, the resulting product mixture is separated and the product is recovered by conventional means such as fractional distillation, fractional crystallization or selective extraction.

The tetrahydrofuran product of the process of the invention has established utility as a solvent since it is miscible with a variety of substances such as water, alcohols, ketones, esters, ethers, and hydrocarbons. Tetrahydrofuran is especially useful as a reaction medium in Grignard and metal hydride reactions and as a solvent for high polymers, particularly polyvinylchloride. α-Methyltetrahydrofuran has the same general solvent properties as tetrahydrofuran and is therefore useful in many applications employing tetrahydrofuran. However, the higher boiling point of α-methyltetrahydrofuran is often of added advantage since it allows solubilization of a greater quantity of material, and hence the use of less solvent with a corresponding decrease in operational costs.

In addtion to utility as a solvent, tetrahydrofuran is useful in the production of polytetramethylene glycol, which is used in the manufacture of polyurethane fibers of the Spandex type by reaction with diisocyanates, e.g., toluene diisocyanate and hexamethylene diisocyanate.

To further illustrate the improved process of the invention, the following examples are provided. It should be understood that the details thereof are not to be regarded as limitations as they may be varied as will be understood by one skilled in this art.

Example I

*Part A.*—A series of runs involving the hydrogenolysis of butyrolactone with a variety of transition metal catalysts on carriers with acidic character was conducted by charging to an autoclave, 20 ml. of butyrolactone and 5 ml. of catalyst, pressurizing the autoclave with hydrogen to 1200 p.s.i. and maintaining the reaction mixture at 200° C. for 6 hours. The products of the reaction were analyzed by gas chromatography using a silicone grease-Teflon column at 140° C. The results of this series are shown in Table I.

TABLE I

| Catalyst | Conversion, percent | Selectivity, percent | |
|---|---|---|---|
| | | Tetra-hydrofuran | 1,4-butanediol |
| 20% Co-Al$_2$O$_3$ | 30 | 60 | 40 |
| 20% Ni-Decalso ᵃ | 10 | 90 | 10 |
| 50% Ni-kieselguhr | 60 | 62 | 10 |
| 20% Cu-Al$_2$O$_3$ | 5 | 90 | 10 |
| 5% Cu-Decalso ᵃ | 30 | 80 | 20 |
| 10% Ru-Al$_2$O$_3$ | 25 | 60 | 40 |
| 10% Pt-Al$_2$O$_3$ | 10 | 50 | 50 |

ᵃ A commercially available alumina-silica support manufactured by Permutit Company.

*Part B.*—To illustrate the enhanced selectivity to tetrahydrofuran obtained in the hydrogenolysis of butyrolactone by using metal catalyst supported on alumina or alumino-silicate carriers, a series of runs under conditions similar to that of Example IA was conducted, except that metal catalyst without supports or with chemically inert supports were used. The 60% selectivity to tetrahydrofuran obtained with 20% Co-Al$_2$O$_3$ decreased to 20% when unsupported Raney Co was used; the 90% selectivity obtained with 20% Ni-Decalso decreased to 60% when unsupported Raney Ni was used; the 90 and 80% selectivity obtained with 20% Cu-Al$_2$O$_3$ and 5% Cu-Decalso, respectively, decreased to 0 when unsupported Raney Cu was used; the 60% selectivity obtained with 10% Ru-Al$_2$O$_3$ decreased to 10% when 5% Ru on carbon was used; and the 50% selectivity obtained with 10% Pt-Al$_2$O$_3$ decreased to 0% when unsupported PtO was used.

Example II

To further illustrate the improvement in selectivity to ether product in the hydrogenation of lactones due to increasing the acidic character of the catalyst supports, the hydrogenolysis of γ-valerolactone using a 20% Co on Al$_2$O$_3$ catalyst incorporating 1% phosphotungstic acid was compared with a similar hydrogenolysis using a 20% Co on Al$_2$O$_3$ catalyst. It was found that the 20% Co-Al$_2$O$_3$ incorporating phosphotungstic acid gave a higher selectivity (90%) to α-methyltetrahydrofuran than the selectivity (70%) obtained with 20% Co-Al$_2$O$_3$ alone.

I claim as my invention:

1. The process of producing cyclic ethers represented by the formula

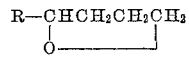

wherein R is hydrogen or methyl by the hydrogenolysis of the corresponding γ-lactones represented by the formula

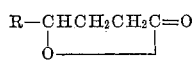

in the presence of a catalyst composition comprising up to 50% by weight of a transition metal catalyst selected from metals of atomic number from 21 to 30 inclusive, ruthenium and platinum and a solid acidic inorganic catalyst carrier selected from alumina and siliceous refractory oxides, at a hydrogen pressure of from about 10 to about 150 atmospheres and at a temperature of from about 100° C. to about 300° C.

2. The process of claim 1 wherein the metal of atomic number from 21 to 30 inclusive is cobalt, nickel or copper.

3. The process of claim 2 wherein R is hydrogen, the transition metal is copper and the siliceous refractory oxide is silica-alumina.

4. The process of claim 2 wherein R is hydrogen, the transition metal is nickel and the siliceous refractory oxide is silica-alumina.

5. The process of claim 2 wherein the carrier incorporates about 0.05% to about 2% of phosphotungstic acid.

References Cited

Alexander: Colloid Chemistry, vol. 6, p. 218, (1948).

NICHOLAS S. RIZZO, *Primary Examiner.*